Nov. 4, 1969 ISAMU KAMEDA ETAL 3,476,909

METHOD OF DEPOSIT WELDING CHROMIUM STEELS

Filed June 17, 1965

United States Patent Office 3,476,909
Patented Nov. 4, 1969

3,476,909
METHOD OF DEPOSIT WELDING CHROMIUM STEELS
Isamu Kameda and Yoshimitsu Uto, Hiroshima, Japan, assignors to Mitsubishi Jukogyo Kabushiki Kaisha, Tokyo, Japan
Continuation-in-part of application Ser. No. 211,835, July 23, 1962. This application June 17, 1965, Ser. No. 464,816
Int. Cl. B23k 9/00, 35/00, 35/22
U.S. Cl. 219—137
8 Claims

ABSTRACT OF THE DISCLOSURE

Chromium steels other than nickel-chromium steels of austenitic structure are welded by depositing on a base metal a chromium-steel type metal containing titanium and niobium in such proportion that the weld metal resulting therefrom has a content of titanium and niobium corresponding to the expression, $2Ti+Nb=6C$ to $14C$ wherein Ti, Nb and C are the proportion of titanium, niobium and carbon respectively in the weld metals. The proportion of titanium and niobium in the metal deposited is determined by estimating the total quantity of carbon in the weld metal, the quantities of carbon and titanium and niobium lost by oxidation during welding and the variations in the quantities of titanium and niobium in the weld metal resulting from the welding process conditions.

---

Figure 1:
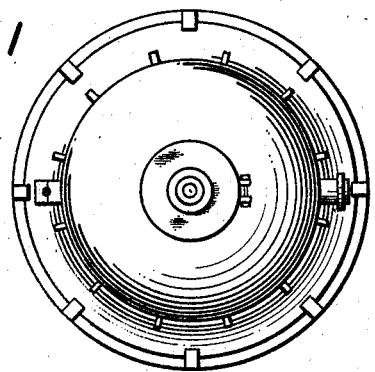

This invention relates to a method of welding members of chromium steels containing from 1 to 25% by weight of chromium and to consumable welding rods used with the same according to various welding techniques.

The invention is a continuation-in-part of our copending U.S. application Ser. No. 211,835, filed July 23, 1962, now abandoned.

The term "chromium steels" used herein is to be interpreted as involving not only chromium steels belonging to the ordinary category in a narrow sense but also general chromium steels, containing from 1 to 25% by weight of chromium, such as various high tensile structural steels and heat-proof steels which are usually called chromium-molybdenum steels, nickel-chromium steels and chromium-nickel-molybdenum steels, various special steels, for example, aluminum-chromium-molybdenum steels, chromium-vanadium steels etc. used for particular purposes and the like. It is to be noted that nickel-chromium steels referred to do not involve stainless nickel-chromium steels of austenitic structure which are not hardened upon welding.

In welding the aforesaid steels containing chromium, consumable welding rods containing alloying ingredients selected from the same group as those in the parent members to be welded are commonly employed. However, the use of such welding rods causes the carbon contained in the rods to be bound with iron or chromium contained in the parent member whereby cementite, martensite, and chromium carbide are formed in the resulting weld metal, so that the weld becomes very hard and brittle. Therefore, the resulting weld or weld metal has a tendency to include cracks which are formed during the cooling operation.

To prevent quenching cracks from occurring in the weld metal during cooling when conventional welding rods, as just described are employed, it is necessary to effect a preheating treatment prior to the welding operation and also to post heat the weld metals to soften them. This procedure increases the number of working steps and complicates the process. Consequently, the use of conventional consumable welding rods has disadvantages including high expense and low efficiency.

An object of the invention is to provide an improved method of welding members of chromium steels of the character above described, in which the aforesaid disadvantages are eliminated.

With this object in view, the invention resides in a method of welding members of chromium steels other than nickel-chromium steels of austenitic structure by using a consumable welding rod or wire including titanium or a combination of titanium and niobium in such proportion that the resulting weld metal includes carbon and either titanium or a combination of titanium and niobium in an amount which corresponds respectively to an expression from the group consisting of $$Ti=C\times b \qquad (1)$$

and $$2Ti+Nb=C\times c \qquad (2)$$

wherein Nb represents the percent content of niobium in said weld metal, Ti the percent content of titanium in said weld metal, and C represents the percent content of carbon in said weld metal and wherein $c$ denotes a numerical value ranging from 6 (six) to 14 (fourteen) and $b$ denotes a numerical value ranging from 3 (three) to 7 (seven). That is, it has been found that when titanium is used alone in a welding rod and/or flux, the content of titanium in the resulting weld metal should be equal to the content of carbon multiplied by a numerical factor ranging from three (3) to seven (7) on the basis of the weight of the weld metal. Alternatively, if both titanium and niobium are selected then twice the content of titanium plus the content of niobium should be equal to the content of carbon multiplied by a numerical factor ranging from six (6) to fourteen (14).

The term "welding rod" used in the specification and appended claims includes, in addition to welding electrodes of rod shape, core wire, core flux electrode, wire used for automatic welding and continuous automatic welding such as coiled continuous wire, and the like. The welding rod may also be a composite rod; for example, titanium or a mixture of titanium and niobium with or without other metals can be included as a powder in the interior of the rod. Also, the term "flux" used herein is interpreted as involving flux and coating agent. The weld metal includes, in addition to the metal portion deposited on the parent metal from the filler metal, all metal portions of the parent metal which are melted during welding so as to be part of the resulting weld.

Another object of the invention is to provide an improved consumable welding rod of chromium steel type with a flux which results in a chromium containing weld metal having such desirable mechanical and physical properties that post heating treatment usually required in order to prevent the occurrence of cracks during cooling operation can be eliminated.

This object of the invention is accomplished by the provision of an improved consumable welding rod of chromium steel type including carbon and either titanium or the combination of titanium and niobium in amounts so that the weld resulting thereon will include these elements in the proportion specified above.

In a preferred embodiment of the invention, a consumable welding rod of chromium steel type may contain 0.13 to 2.5% of titanium based upon the weight of the rod.

If both niobium and titanium are included in a consumable welding rod for use in welding chromium steels, both elements may be advantageously included in the rod in such proportion that twice the content of titanium plus the content of niobium ranges from 0.26 to 5.0% by weight.

The content of titanium preferably ranges from more than 0.8% to 2.0% by weight.

It is known that in order to prevent the occurrence of blow holes in weld metals to provide the sound products or to effect the growth of very fine crystals in the weld metals to increase their strength, a small amount of titanium as well as aluminum, zirconium, vanadium, tantalum, magnesium and/or manganese may be added to a welding rod because such elements have high affinities to oxygen and nitrogen. Such a welding rod is normally used in air. However as titanium is far higher in affinity to oxygen than to carbon the same is converted into oxides but from no compound with carbon after welding. The invention is noticeable in that in a gas shield atmosphere titanium is used in conjunction with carbon in an amount as above specified for the purpose of preventing the formation of carbides in the resulting weld metal.

In manufacturing apparatus used in the field of chemical industries and especially of petroleum refiner, clad steel sheets comprsing low chromium steels are often used as base materials and stainless 13%-chromium steels as cladding materials. In welding such clad steel sheets, it is common practice to weld first the side of the base material and then to weld the side of the cladding material. Under these circumstances, during welding of the first layer portion on the cladding side, a portion of the weld metal being formed thereon will penetrate the adjacent part of the weld metal previously formed on the base side, resulting in a decrease in the high temperature creep limit or strength of the weld metal formed on the cladding side. It is highly desirable to avoid this drawback.

Another object of the invention is, therefore, to provide an improved consumable welding rod which does not have the just described disadvantage.

This object is accomplished by the provision of an improved consumable welding rod including titanium or a combination of titanium and niobium in the amounts indicated above and further including from 0.3 to 5.5% of molybdenum based upon the weight of the rod. According to a further aspect of the invention, the rod may preferably include 0.13 to 2.5% titanium and 0.3 to 5.5% molybdenum by weight, and the rod may also include 0.07 to 1.3% titanium, 0.15 to 5.0% of niobium, and 0.3 to 5.5% of molybdenum based upon the weight of the rod, the latter combination being particularly preferred.

Figure 3:
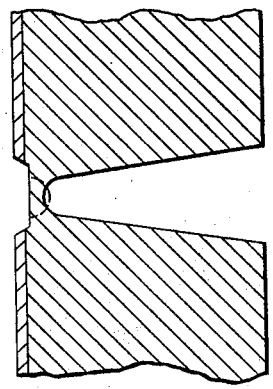
Figure 2:
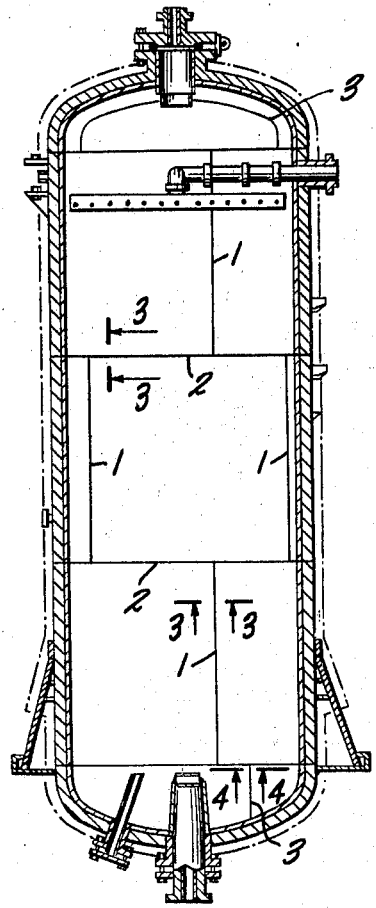
Figure 4:
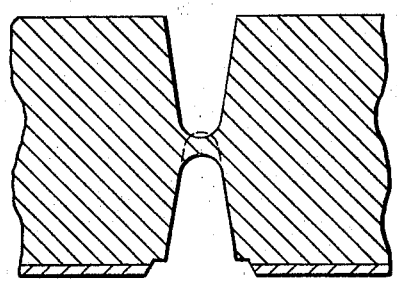

FIGURE 1 is a plan view and FIGURE 2 is a vertical section of a reactor welded in accordance with the process of the present invention. FIGURES 3 and 4 are enlarged schematic sectional views illustrating the present welding process.

Both niobium or columbium and titanium included in welding rods and/or fluxes according to the teaching of the invention have an affinity or a binding power for carbon higher than that of chromium and iron and hence titanium and niobium, each suppress from hardening and embrittling of weld metals which results from the formation of cementite, martensite, chromium carbide etc., due to binding of chromium and iron with carbon in the weld metal.

The amount of titanium or of titanium and niobium in the weld metal therefore depends upon the content of carbon in the same. It has been found that the presence of titanium alone in an amount equal to three to seven times the content of carbon effectively prevents the formation of the carbides and the like caused by the binding of carbon. It has been also found that, when both niobium and titanium are included in the resulting weld metal, the harmful carbides and the like, formed by the binding of carbon with chromium and iron in the weld metal are effectively eliminated in the presence of niobium and titanium in amounts satisfying the previous expression $$2Ti + Nb = C \times c$$
$$= C \times (6 \sim 14)$$

This expression results from the fact that titanium has a binding power for carbon approximately twice that of niobium.

The reasons for the specification of the lower and upper limits of niobium and titanium as above described include the fact that if niobium or titanium is present in an amount below the carbon content of three times or six times respectively, the resulting weld metal is objectionable in that it is hardened and embrittled due to the increased formation of harmful carbides. On the other hand, if the content of niobium or titanium exceeds the carbon content by seven or fourteen times respectively, oxides are produced in the weld metal resulting in decreased purity of the weld. Further, the use of greater amounts of niobium and titanium is not economical.

In practicing the invention, niobium and/or titanium may be included directly in a welding rod alone or in a flux alone. Alternatively, both welding rod and flux may include niobium and/or titanium in any suitable proportions. The greater part of niobium included in the welding rod will migrate into the resulting weld metal even during air welding without a large loss thereof and affects the weld metal in the desired manner as above described. However, much titanium may be lost during welding because of its oxidation. Therefore, the present welding rod including titanium is preferably used in an atmosphere of any suitable inert gas.

If it is desired to include titanium or titanum and niobium in a flux rather than in a welding rod, then it is preferable to include the same in the flux in excess of the amount desired to migrate to the resulting weld metal since, inevitably, niobium and titanium partially remain in the resulting slag. It is to be understood that, niobium which is rather expensive may be included preferably in a welding rod in order to increase the proportion thereof migrating to the deposit metal.

The inclusion of titanium or niobium in the welding rod also serves to reduce the hardness of the welding rod and to improve its brittleness whereby the rod can easily be prepared by a drawing operation. Thus, the addition of titanium or niobium to a welding rod results in dual benefits; migration into the resulting deposit metals is surred and the operation of drawing the rods is facilitated.

As pointed out above, the greater proportion of titanium and niobium included in a welding rod will migrate into the resulting weld metal during welding. However, in most cases, titanium and niobium are partially lost due to oxidation and hence the total amount thereof does not always migrate into the weld metal. In addition, a portion of the material of the parent member to be welded will penetrate into the weld metal resulting in an increase of carbon content in the weld. Therefore, the amount of titanium or the combination of titanium and niobium to be added to a welding rod must be determined in consideration of the phenomena just described. In general, loss of niobium and titanium due to oxidation and the like depends upon various factors such as a state under which the same has been added to the rod, welding process, whether a flux is used and the type of flux, welding atmosphere and the like. Titanium or the combination of titanium and niobium can be included in a welding rod or in flux in the form of either element metal or alloy. Titanium or the combination of titanium and niobium included in a welding rod and/or flux can be estimated to be decreased in amount by approximately at most 30% of the added weight during a welding operation.

The amount of parent material which has penetrated into the weld metal may vary considerably in accordance with the type of parent material, magnitude of welding current, polarity of current applied to a workpiece, whether direct current or alternating current is used, and other welding conditions. In the ordinary cases, however, the amount of the mother material penetrated into the weld metal can be reasonably considered to be less than approximately 30% of the total weight of the weld metal. The remaining portion of the weld metal in this case approximately 70% thereof will originate from the welding rod. The invention will now be described in terms of welding rods especially suitable for use in welding of chromium steels containing carbon in amount ranging from .03 to .30%.

It is assumed that as a welding rod a chromium steel is used including a composition comprising .02 to .12% C, up to 1% Si, up to 1% Mn, up to .03% P, up to .03% S, etc. In order to determine the amount of titanium to be included in a welding rod and/or in a flux made of the aforesaid chromium steel, the content of carbon in the resulting weld metal is first calculated. The carbon included in the weld metal originates from carbon migrating from the welding rod into the deposit metal and carbon penetrated from the parent material being welded. Assuming that the weld metal is composed of 70% of the welding rod and 30% of the mother material, as previously explained, an amount of carbon migrating from the rod into the weld metal is calculated at $$(.02 \sim .12\%) \times 0.7 = .014 \sim .084\% \quad (3)$$

An amount of carbon migrating from the parent material into the weld metal is calculated at $$(.03 \sim .30\%) \times 0.3 = .009 \sim .09\% \quad (4)$$

By adding the Equations 3 and 4, the total content of carbon is given $$.023 \sim .17\% \quad (5)$$

According to the invention, titanium is required to be added to the welding rod in an amount equal to three times to seven times that content of carbon. Therefore, the amount of titanium is calculated at $$(0.23 \sim .17\%) \times (3 \sim 7) = .069 \sim 1.218\% \quad (6)$$

Assuming that the oxidation loss is 30%, the amount of titanium is increased to $$(.069 \sim 1.218\%) \div .17 = .098 \sim 1.74\% \quad (7)$$

In this case it is to be understood that welding is effected in an atmosphere of any suitable inert gas. Finally, by taking into account, the particular flux or the particular welding process used (e.g. increase in the amount of carbon in the weld metal resulting from the use of carbon dioxide welding process) the final amount of titanium to be included in the welding rod and/or the flux is calculated at $$(.098 \sim 1.74\%) \div .17 = .14 \sim 2.49\% \quad (8)$$

on the basis of the weight of the welding rod.

Similarly the total amount of niobium and titanium to be added to a welding rod and/or flux of the chromium steel as above set forth can be determined, and results with the equation:

$$2Ti + Nb = .28 \sim 4.97\% \quad (9)$$

wherein Ti represents the content of titanium in the resulting weld metal and Nb represents the content of niobium in the weld metal.

In order to determine with greater precision the amount of titanium or of titanium and niobium to be included in either or both of the filler metal and flux according to the invention, the following more rigorous method can be used. The carbon content of the weld metal can be expressed by the equation:

$$C = [WC_1 x + C_2 (1-x)] \quad (10)$$

where:
W = weight of weld metal
$C_1$ = average percent content of carbon in the fused portion of parent metal
$C_2$ = average percent content of carbon in weld metal
$x$ = the proportion of the weld metal originating from the parent metal The weight of the weld metal can be calculated from the dimension of a groove and amount of reinforcement, or from a sectional area perpendicular to the welding axis of the weld, a weld length and the specific gravity of the weld metal, and generally is predetermined upon the design of welding.

The amount of carbon $WC_1 x$ contained in the fused portion of the metal can be estimated from the composition of the parent metal and the above mentioned welding requirements in the following manner. The proportion $C_1$ of carbon contained in the particular parent metal may be obtained from the chemical composition thereof, furnished by a manufacturer of that metal. From the welding requirements, the total weight $Wb$, of that portion of the parent metal molten by welding heat can be estimated.

In addition, the amount of carbon and the amount of titanium and niobium lost by oxidation from the parent metal during welding can be estimated from various welding requirements. If $\eta C_1$ designates a ratio between the carbon content $C_1 Wx$ in the fused portion of the parent metal, and the total carbon content in that portion of the parent metal molten by welding heat (which is called a "yield rate of carbon" in the fused portion of the parent metal). Then, the following equation can be $$W \cdot C_1 x = W_b \eta_{c_1} C'_1 \quad (11)$$

The carbon content $W \cdot C_2 (1-x)$ in the weld metal can be calculated as follows: Under the assumed conditions for welding, a weight of a filler metal $W_c$ can be estimated, except for the portion thereof remaining unused. Upon design, a rate of weight $W(1-x)$ of weld metal to lost weight $W_c$, or deposition rate $\eta w$ is first estimated from the assumed welding requirement and then the weight to be lost is determined. On the basis of this determination the necessary amounts of welding materials are prepared.

Assuming that $C'_{2w}$ designates a proportion of carbon contained in the filler metal and that $\eta_{cw}$ designates a deposition rate of carbon contained in the filler metal, then the carbon content C in the weld metal (see the Equation 10), is expressed by the equation $$C = [WC_1 x + C_2 (1-x)]$$
$$= W_b \eta_{c_1} C'_1 + W_c \eta_{cw} C'_{2w} \quad (2)$$

With respect to the carbon content in the weld metal thus determined, the amount of titanium or of the combination of titanium and nobium included should be calculated to hold the Equations 1 and 2 over the entire region of the weld metal. To this end, titanium or titanium and niobium must be added to either or both of the filler metal and the flux in the respective amounts equal to the calculated amounts plus certain additions. Thus, the following equations are obtained.

$$Ti' = \frac{(3 \sim 7) \times Wb \cdot \eta_{c_1} C'_1 + Wc \cdot \eta_{cw} C'_{2w}}{\eta_a} \quad (13)$$

and $$Nb' + 2Ti' = \frac{(6 \sim 14)(Wb \cdot \eta_{c_1} C'_1 + Wc \cdot \eta_{cw} C'_{2w})}{\eta_a} \quad (14)$$

As previously explained, $C'_1$ and $C'_{2w}$ have been predetermined from the conditions under which the materials to be welded are used or from the welding requirements. $W_b$ and $W_c$ are usually calculated from W and the welding requirements. Also $\eta_{c_1}$, $\eta_{cw}$ and $\eta_a$ can be estimated by experiments.

In Table I are listed magnitudes of Vickers hardness of various weld metals, containing chrominum in different amounts formed by the conventional welding rods and various weld metals of the present welding rods having the same composition as that indicated for the conventional rods but including in addition titanium or the combination of titanium and niobium.

TABLE I.—COMPOSITION AND HARDNESS OF WELD METAL

| Approx. Percentage of Chromium | Composition in percent | | | Vickers Hardness of Conventional Weld Metal | Vickers Hardness of Present Weld Metal |
| --- | --- | --- | --- | --- | --- |
| | C | Cr | Mo | | |
| 1% Cr | .11 | .90 | | 310 | *140-172 |
| 3% Cr | .16 | 2.97 | | 331 | *153-185 |
| 3% Cr | .12 | 3.94 | | 363 | 151-183 |
| 5% Cr | .19 | 5.03 | 1.67 | 335 | 158-194 |
| 5% Cr | .18 | 5.24 | .57 | 390 | *160-196 |
| 10% Cr | .22 | 10.73 | 2.04 | 320 | *167-202 |
|  |  |  |  |  | 158-211 |
| 13% Cr | .11 | 12.5 | | 363 | 175-190 |
| 18% Cr | .11 | 17.7 | | 269 | *161-193 |
| 25% Cr | .10 | 27.0 | | 262 | |

The first column of Table I indicates the nominal percentages of chromium content in chromium steels used as welding rods and the second column indicates the chemical analysis of the resulting weld metals. The third column involves measured values of Vickers hardness of the conventional weld metals having the compositions indicated in the corresponding rows of the second column respectively. Each of these figures was measured at any point on the associated specimen. The fourth column involves measured magnitudes of Vickers hardness of the weld metals of the instant invention including the compositions indicated in the corresponding rows of the second column respectively and with the asterisked figures obtained for the weld metals each also including titanium in an amount equal to five times the content of carbon in the weld metal while the remaining figures were obtained for those each including the combination of titanium and niobium in an amount equal to ten times the content of carbon in the weld metal. Each of the specimens cut from weld metals of the present invention had measurement of hardness conducted at several points hereon and the maximum and minimum values are indicated in the fourth column.

From Table I it is apparent that the weld metals of the instant invention have very low Vickers hardnesses compared with conventional weld metals although the magnitudes thereof vary over a relatively wide range because of the inherent nature of the weld metals.

The reason for the decrease in Vickers hardness, as previously described, is due to the presence of titanium or the combination of titanium and niobium in the proper amount in the weld metal which effectively prevents the binding of carbon with the chromium and/or iron contained in the weld metal and hence prevents the precipitation of chromium carbide, cementite and/or martensite. This was confirmed by determining the microstructure of the deposit metals under a microscope.

As above described, weld metal obtained according to the invention does not contain harmful precipitate. Therefore, such weld metal has not only low hardness, but also, as will be described hereinafter, has a high degree of toughness and does not develop the cracks which usually occur upon quenching following welding. Therefore, pre- and post-heat treatments can be eliminated by means of the instant process.

The invention also will be described in conjunction with welding of hot-rolled sheets of stainless steels, such as AISI type 405 stainless steel, containing aluminum for the purpose of preventing self-hardening due to a thermal effect. Because of its high resistance to sulphur gases, this type of stainless steel is frequently used in oil refinery equipment as anti-corrosive and heat-proof material. However, if these sheets are welded by using 13% Cr welding rods available in the market, the welded parts are hardened due to their self-hardening property. Therefore, those portions of such sheets to be welded are required to be preheated at a temperature of from 200° to 300° C. and the welded parts must be post heated at a temperature of from 700° to 750° C. in order to soften the same. This results in a great increase in cost.

To avoid the drawback just described, in the past, welding rods of austenitic stainless steel type, for example, of 25% chromium-20% nickel type or 25% chromium-12% nickel type, having not self-hardening property have been used in welding stainless steel containing aluminum. If such welding rods and aluminum containing stainless steels are used in manufacturing petroleum chemical equipments, various serious problems are encountered. For example, the resulting weld metals are corroded by sulfur compounds in corrosive atmospheres because of difference in the composition of the weld and parent metal which has been welded. Corrosion of the weld metal causes a reduction in the intercrystalline corrosion-resisting property of the weld metal. The intercrystalline corrosion-resisting property of the weld metal may be also adversely affected by thermal stresses developed therein due to the difference in the coefficients of thermal expansion of the weld and parent metals from an annealing operation to remove welding stresses, and from a bending operation at elevated temperatures. When such operations are effected at a temperature of about 500° to 800° C., the intercrystalline corrosion-resisting property is much reduced. Further, chlorides can develop stress corrosion cracks in the weld metals. In addition, the welding rods used per se are quite expensive because of their high nickel content.

In contrast, according to the invention, a welding rod of 13% chromium steel type belonging to the same category as the parent material to be welded is employed which results in various advantages. This type of welding rod may include from 11.5 to 14.5% of chromium. For example, electrolytic corrosion does not usually develop in the resulting weld metal because the material of welding rod used is of the same type as the mother material. The weld metal develops no serious corrosion such as intercrystalline corrosion and corrosion fatigue which frequently occur in austenitic stainless steels due to the action of sulfur compounds or of chlorides. There is no decrease in the anti-corrosive property of the weld metals of the instant invention due to the precipitation of carbides on grain boundaries during annealing of the product as usually occurs with austenitic stainless steels. The product weld of the instant invention is free from damages such as corrosion fatigue, thermal stress and the like caused therein from difference in coefficients of thermal expansion. This is because the composition of the welding rod used is of the same type as that of the parent material to be welded.

Thus, the invention provides a non-self-hardened weld metal welded on a parent member by using a welding rod including a composition of same type as the parent member and also including titanium or a combination of titanium and niobium in the specified amount, as illustrated by the examples. It should be noted also, that the weld metal does not include expensive nickel in large amount.

EXAMPLE I

Sheets of AISI type 405 stainless steels were welded by using the conventional 13 chromium welding rods similar in composition to the sheets and the welding rods of the invention respectively. The resulting weld metals included the compositions listed in Table II.

TABLE II.—COMPOSITION OF WELDING ROD AND WELD METAL

| Composition | Welding Rod | | | | | | Weld Metal | | | | | |
| --- | --- | --- | --- | --- | --- | --- | --- | --- | --- | --- | --- | --- |
| | C | Si | Mn | Cr | Ti | Nb | C | Si | Mn | Cr | Ti | Nb |
| Used Welding Rod: | | | | | | | | | | | | |
| Present Rod A | 0.071 | 0.59 | 0.41 | 13.71 | 0.48 | 0 | 0.065 | 0.56 | 0.34 | 13.41 | 0.36 | |
| Present Rod B | 0.068 | 0.52 | 0.42 | 13.65 | 0.34 | 0.29 | 0.062 | 0.48 | 0.38 | 13.14 | 0.26 | 0.21 |
| Conventional Rod | 0.068 | 0.75 | 0.65 | 13.88 | | | 0.063 | 0.72 | 0.60 | 13.57 | | |

By using a Fisco crack tester the weld metals were tested for crack rate and their mechanical properties were determined. The results are given in Table III and IV respectively.

TABLE III.—CRACK RATE FOR WELD METAL IN PERCENT

| Pre-Heating | Room Temperature | 100° C. | 200° C. | 300° C. |
|---|---|---|---|---|
| Used Welding Rod: | | | | |
| Present Rod A | 5.6 | 1.2 | 0 | 0 |
| Present Rod B | 4.8 | 1.1 | 0 | 0 |
| Conventional Rod | 100 | 58.1 | 34.8 | 9.5 |

Remark: The crack rates are represented in terms of a relative length of crack with respect to a weld length.

TABLE IV.—MECHANICAL PROPERTIES OF WELD METAL

| | Tensile Strength in kg./mm.$^2$ | | Elongation in percent | | Hardness Hv | | Charpy Impact, kg.-m-cm.$^2$ | |
|---|---|---|---|---|---|---|---|---|
| | As welded | Annealed* | As welded | Annealed* | As welded | Annealed* | As welded | Annealed* |
| Used welding rod: | | | | | | | | |
| Present Rod A | 75.4 | 65.1 | 16.1 | 25.4 | 217 | 181 | 4.6 | 12.5 |
| Present Rod B | 74.6 | 66.4 | 17.5 | 26.2 | 213 | 176 | 5.4 | 12.9 |
| Conventional Rod | 112.8 | 66.7 | 9.4 | 25.0 | 872 | 187 | 1.2 | 12.4 |

*Specimens were annealed at 720° C. for 2 hours and then cooled in air in order to remove stresses from the same.

EXAMPLES 2–7

Chromium steel cores having added thereto molybdenum, titanium and niobium in amounts specified in Table V were used in Examples 2–7 to form weld metals to about 15 mm. on AISI type 405 plate through an argon shielded welding operation. Samples cut from each of the weld metals have been found to have the chemical composition and the mechanical properties tabulated in Table V.

Table VI indicates the composition of various hot-rolled steel sheets used in terms of the same properties as determined for the weld metals and listed as specimen Nos. 1–9. Specimen 10 in Table VI is weld metal obtained by a conventional procedure.

From Tables IV and V it will be apparent that, as compared with the conventional rod used, the invention has provided a weld metal having a very low hardness even as it was welded. The figures of the tensile strength and elongation indicate that the weld metal according to the invention had satisfactory toughness even as it was welded. This is clearly shown in Table III wherein the results of crack tests are tabulated. As shown in Table III, the present invention gave extremely excellent results although the test upon which the data in Table III were based would have been severe as a test for crack sensitivity. Thus, the weld metal according to the invention does not need to be preheated except for an extremely cold condition.

From the foregoing, it will be appreciated that the invention is applicable to a variety of chromium steels with excellent results. Among them, the so-called stainless 13%-chromium steels including about 11.5 to 14.5% of chromium, small amounts of carbon, silicon, manganese, phosphor, sulfur, and impurities; and optionally including small amounts of aluminum and other element or elements for the purpose of improving their properties are frequently used as claddings for sheet steels, such as ASTM type A-204 steel etc., for use in high temperature-pressure vessels and low chromium steel alloys, such as ASTM type A-387, type A-357 steels etc. containing 1 to 5% of chromium in order to prepare apparatus employed in the field of chemical industries and more particularly of petroleum refinery. Examples of stainless 13%-chromium steels involve AISI type 403, type 405, type 410, etc.

In welding clad members, it is common practice to weld first the side of a thick base metallic material with any suitable welding rod similar in type to the base material and then to remove the bottom portion of bead, and thereafter to weld the cladding material side.

The invention is applicable to and advantageous with respect to welding of such a clad member. More specifically, as in the previously described simple construction of chromium steels, a cladding chromium steel and composite construction generally of chromium steels is advantageously welded by a weld metal in which titanium or a combination of titanium and niobium originating from a welding rod and/or a flux is present in the indicated amount with respect to a carbon content of the weld metal, so that the deposit metal is substantially free from hardening, selective corrosion etc. In this case, however, it has been found that a serious problem of dilution of ingredients in the weld metal is still present. When a composite construction of chromium steels is welded with a welding rod having a composition similar to the stainless chromium steel of a cladding member, the ingredients, especially chromium originating from the welding rod are diluted by the penetration of a portion of the weld metal present on the previously welded adjacent base portion into the newly formed weld metal. As an example, it is assumed that a base member is formed of 1% chromium-.5% molybdenum steel alloy such as ASTM type A-387, Grade B steel and that a cladding member is formed of 13% chromium steel containing aluminum (e.g. AISI type 405 steel). Under these circumstances, if a welding rod of 13% chromium steel similar in type to the cladding member is used to effect welding of a first layer of the cladding member, then a chromium content in that portion of a weld metal corresponding to the first layer of the cladding side is diluted by the order of about 9%, by the penetration of a portion of the weld metal already present on the base member. The weld metal thus diluted is listed as specimen No. 10 in Table VI.

As seen in Table VI, weld metal, specimen No. 1 has a creep strength as low as 3.9 kg./mm.$^2$ at 510° C. The essential components of petroleum refinery apparatus are operated at elevated temperatures such as 510° C. As example of a suitable base material that might be used for petroleum refinery apparatus is hot rolled steel sheet specimen No. 7 listed in Table VI and having a creep strength of 7.7 kg./mm.$^2$. Therefore, the weld metal has a very low creep strength as compared with the associated steel sheet.

The use of a welding rod of 13% chromium steel including titanium or the combination of titanium and niobium in the indicated amount according to the invention resulted in a weld metal having a higher creep strength than ordinary weld metal; however, when the chromium content of the weld metal is diluted as described above, the creep strength of the weld metal is lowered and therefore the resulting weld metal usually has a creep strength inferior to that of the base metal.

This means that in a device such as a reaction tower in a petroleum refinery equipment, the base material which has to provide the greater part of the mechanical strength during an operation is reduced in strength by a magnitude corresponding to the thickness of the portion of the weld metal which has penetrated into the adjacent portion of its cladding material. In order to ensure that such a device has sufficient strength without increasing the thickness of the base material, it is highly desirable to increase the mechanical strength and especially the high temperature creep strength of the weld metal portion in a first layer on and adjacent to the boundary of the base material.

A substantial improvement of the mechanical properties of said weld metal portion in the first layer results according to the invention, by including in the weld metal containing titanium or a combination of titanium and niobium in the indicated amount, a controlled amount of a suitable element metal, in the above case, .2 to 3% of molybdenum.

In order to contain .2 to 3.0% of molybdenum in the resulting weld metal, the required content of molybdenum in the welding rod and/or the flux is calculated as follows, $$(.2 \sim 3.0)\% \div .7 = .30 \sim 4.3\% \tag{15}$$

taking into account the penetration of molybdenum into the portion of the weld metal on the base side. It can be reasonably assumed that, if the portion of the weld metal on the base material side contains no molybdenum, a maximum of approximately 30% of molybdenum will penetrate from the weld metal of the first layer of the cladding side into said base-weld metal. Also, it can be assumed that at most, approximately 20% of molybdenum contained in the welding rod and/or the flux will be lost due to oxidation during the welding operation, although the loss of molybdenum may vary considerably depending upon the welding operation involved. Considering the oxidation loss of molybdenum during welding this calculated value is corrected to be $$(.3 \sim 4.3)\% \div .8 = .36 \sim 5.5 \tag{16}$$

Accordingly the required amount of molybdenum to be added to a welding rod and/or a flux has been calculated at .36~5.5%. However, if molybdenum is contained in the portion of the weld metal on the base side, the loss of molybdenum due to its penetration into base-weld metal may be appreciably decreased, and also, the oxidation loss of moybdenum may be reduced during welding operation. This leads to the final content of molybdenum in a welding rod and/or a flux ranging from approximately .3 to 5.5%.

The following examples illustrate welding of metals having a composite structure.

EXAMPLE 8

A reactor for reforming petroleum products, namely a No. 2 unified reactor equipped on Tokuyama Refinery of Idemitsu Kosan Kabushiki Kaisha as specified below was welded on the cladding side according to the instant invention. The chemical composition of the filler rod, filler metal and the resulting weld metal and the mechanical properties of the filler metal are set forth in Table VII.

Specification of reactor (see FIGS. 1 and 2):

Type: Fixed catalyst bed
Dimensions:
    Overall height—8.56 m.
    Height of cylindrical pattern—6.553 m.
    Diameter (outer)—2.464 m.
    Diameter (inner)—2.286 m.
    Thickness of shell—0.089 m.
Design pressure: 65 kg./cm.$^2$G
Hydraulic test pressure: 120 kg./cm.$^2$G
Pneumatic test pressure: 72 kg./cm.$^2$G
Leakage test:
    Reinforcing rods—7 kg./cm.$^2$G
    Linings—1.5 kg./cm.$^2$G
Design temperature: 454° C.
Radiographing: Full (JIS Grade 2)
Stress relief: Yes Although the invention eliminates the necessity of relieving stress in the resulting products the reactor was legally required to be subject to annealing because of hydrogen used at elevated temperatures under high pressures.

Material

Body: Clad steel corresponding to ASTM264: 89 mm. thick

Base metal: ASTM–A204–A–FBQ (low Mo steel) 85.5 mm. thick
Clad metal: AISI 405 (13 Cr-Al steel)
Nozzle and flange: AISI 405 lining
Internal equipment: AISI 405

Welding

Shape and dimension of groove:
    Shell long and circular seams, illustrated in FIGURE 3
        Thickness of shell: 0.089 m.
        Shape of groove:
            Depth: 0.078 m.
            Angle between side walls of groove: 15°
            Curvature of bottom (radius): 0.008 m.
            Symmetrical incliniation of side walls.
        Shape of inside cavity against the bottom of groove:
            Depth: 0.055 m.
            Width of top aperture: 0.022 m.
            Angle between side walls of cavity: 60°
    Head long seams, illustrated in FIGURE 4
        Thickness of shell: 0.089 m.
        Inside groove:
            Depth: 0.0295 m.
            Angle between side walls of groove: 15°
            Curvature of bottom (radius): 0.008 m.
        Outside groove:
            Depth: 0.0485 m.
            Angle between side walls of groove: 15°
            Curvature of bottom (radius): 0.008 m.
    Distance between the bottom surface of both grooves: 0.006 m.
    Both grooves have symmetrical inclination of side walls.
    Inside cavity having the inside groove:
        Depth: 0.005 m.
        Angle between side walls of cavity: 60°
        Width of intermediate edges: 0.005 m.
        Symmetrical inclination of side walls.
Welding on base side: Union welding automatic.
Core rod: Oxweld No. 40A (produced by Kobe-Seiko Kabushiki Kaisha).
Composition: Union weld grade 80 (produced by Linde Aire Products Co.).
Welding on cladding side: Arc Welding: Using the present invention. Filler rods used have a diameter of 3.6 mm., and composition, and mechanical strengths listed in Table VII which also lists a composition of the resulting weld metal.

EXAMPLE 9.—REPAIRING PUMP IMPELLERS OF 13 Cr-STEEL

The argon gas shield tungsten arc welding was performed with a filler rod having a diameter of 3.6 mm. The chemical composition of the filler rod, filler metal and weld metal and the mechanical strength of the filler metal is set forth in Table VII.

EXAMPLE 10.—BUTT WELDING OF 13 Cr-STEEL PIPES

The pipe used had a thickness of 6 mm. and an outside diameter of 54 mm. The chemical composition of the filler rod, filler metal and weld metal and the mechanical strength of the filler metal is set forth in Table VII.

The invention has been described in conjunction with welding of a clad steel sheet in which a 13% chromium steel is used as a cladding material, however, it is equally applicable to welding of any clad steel sheet including cladding and base materials different from those above described.

While the invention has been described in conjunction with certain preferred examples thereof, it is to be understood that various changes and modifications may be resorted to without departing from the spirit and scope of the invention. For example, the type of cladding and base materials composing of clad steels and more particularly of weld metals dependent upon the base materials are not restricted to those indicated in the examples as previously described. If desired it may be varied, for example, in accordance with the required strength of the resulting welded joint. Also, a welding rod and/or a flux may be varied in composition, if desired. Further, upon welding the cladding side of a clad steel, a welding rod such as above described may be used to weld its first layer while any other suitable rod or rods may be used to weld the second and subsequent layers of the cladding side.

Further, if respective materials for a stainless chromium steel sheet and a base metal plate to be lined therewith are similar in combination to the clad steels previously described, then the welding method, according to the invention is advantageously applicable to the lining of the plate with the sheet by direct welding technique. It is also applicable to welding stainless chromium steel pipes with low chromium-molybedum steel pipes. In this case, the invention gives results similar to those obtained with the clad steels previously described.

and niobium in such proportion that the weld metal resulting therefrom has a content of said titanium and said niobium which corresponds to the 2Ti+Nb=6C to 14C wherein Ti, Nb and C are the proportion of titanium, niobium and carbon respectively in said weld metal, the proportion of said titanium and said niobium in said filler metal to obtain said proportion in said weld metal being determined by estimating the total quantity of carbon in said weld metal, the quantities of carbon and said titanium and said niobium lost by oxidation during welding, and the variation in the quantities of said titanium and said niobium and carbon in said weld metal resulting from welding process conditions including welding current, flux used, and welding atmosphere.

2. In a method of welding members of chromium-steels other than nickel-chromium steels of austenitic structure, the step which comprises depositing on a parent metal a chromium-steel type filler metal containing molybdenum, titanium and niobium in such proportion that the weld metal resulting therefrom has a molybdenum content of 0.2% to 3.0% and a content of said titanium and said niobium which corresponds to an expression 2Ti+Nb=6C to 14C wherein Ti, Nb and C are the pro-

TABLE V.—COMPOSITION AND MECHANICAL PROPERTIES OF WELD METAL

| Ex. No. | Type of Steel (Weld Metal) | Chemical Composition in percent | | | | | | Mechanical Properties at Room Temperature | | | Creep Strength in Kg./mm.² (1%/10⁵ Hr. Creep Strain Rate) | | | | |
|---|---|---|---|---|---|---|---|---|---|---|---|---|---|---|---|
| | | C | Mn | Cr | Mo | Nb | Ti | Tensile Strength in Kg./mm.² | Yield Point in Kg./mm.² | Elongation in percent | 454° C. | 482° C. | 510° C. | 538° C. | 566° C. |
| 2 | 12% Cr-Ti-Nb-0.5 Mo | 0.06 | 0.42 | 12.81 | 0.51 | 0.34 | 0.15 | 54.7 | | 31.4 | 8.8 | 8.2 | 6.4 | 4.6 | 3.1 |
| 3 | 9% Cr-Ti-Nb-0.5 Mo | 0.08 | 0.37 | 9.46 | 0.53 | 0.45 | 0.18 | 57.6 | | 29.1 | 10.4 | 9.3 | 7.6 | 5.2 | 3.7 |
| 4 | 12% Cr-Ti-0.5 Mo | 0.21 | 0.36 | 12.49 | 0.51 | | 1.15 | 65.3 | | 28.4 | 10.6 | 9.7 | 7.7 | 5.1 | 3.8 |
| 5 | 9% Cr-Ti-0.5 Mo | 0.18 | 0.34 | 9.18 | 0.54 | | 1.08 | 62.5 | | 28.4 | 11.3 | 10.1 | 8.2 | 6.2 | 3.9 |
| 6 | 12% Cr-Ti-Nb-1.5 Mo | 0.06 | 0.36 | 12.52 | 1.54 | 0.35 | 0.16 | 56.4 | | 31.6 | 9.0 | 8.4 | 7.5 | 4.8 | 3.5 |
| 7 | 9% Cr-Ti-Nb-1.5 Mo | 0.08 | 0.34 | 9.33 | 1.52 | 0.43 | 0.19 | 59.7 | | 28.7 | 10.6 | 9.8 | 8.0 | 5.6 | 3.7 |

Remark: Stress was removed by annealing at 710° C. for 2 hours followed by cooling in furnace.

TABLE VI.—COMPOSITION AND MECHANICAL PROPERTIES OF ROLLED SHEET

| Specimen No. | Type of Steel | Chemical Composition | | | | | | Mechanical Properties at Room Temperature | | | Creep Strength in kg-/mm.² (1%/10⁵ Hr. Creep Strain Rate) | | | | |
|---|---|---|---|---|---|---|---|---|---|---|---|---|---|---|---|
| | | C | Mn | Si | Cr | | Mo | Tensile Strength in kg./mm.² | Yield Point in kg./mm.² | Elongation in Percent | 454° C. | 482° C. | 510° C. | 538° C. | 566° C. |
| 1 | 12% Cr-Al | <.08 | <1.0 | <1.0 | 11.50~14.50 | Al 10~.30 | | >42.2 | >17.6 | >20 | 7.1 | 6.4 | 5.6 | 2.8 | |
| 2 | 12% Cr | <.15 | <1.0 | <1.0 | 11.50~13.50 | | | >45.7 | >21.1 | >20 | 8.5 | 7.7 | 6.2 | 4.5 | 3.1 |
| 3 | 17% Cr | <.12 | <1.00 | <1.0 | 16.00~18.00 | | | >45.7 | >21.1 | >22 | 8.1 | 7.6 | 6.5 | 4.6 | 3.1 |
| 4 | 0.5% Mo | <.23 | <.90 | .15~.30 | | | .45~.60 | 457~.54.1 | >26.0 | >25 | 10.1 | 8.8 | 7.0 | 4.4 | |
| 5 | 0.5% Mo | *<.25 | <.90 | .15~.30 | | | .45~.60 | 49.2~59.8 | <28.1 | >23 | 10.5 | 9.0 | 7.0 | 4.4 | |
| 6 | 0.5% Mo | *<.28 | <.90 | .15~.30 | | | .45~.60 | 52.7~63.3 | >30.2 | >22 | 11.2 | 9.1 | 7.0 | 4.4 | |
| 7 | 1% Cr-0.5% Mo | <.17 | .40~.65 | .15~.30 | .80~1.15 | | .45~.65 | 42.2~57.6 | >24.6 | >24 | 10.0 | 9.2 | 7.7 | 5.3 | 3.5 |
| 8 | 2¼% Cr-1% Mo | <.15 | .30~.60 | <.50 | 2.00~2.50 | | .90~1.10 | 42.2~59.8 | >21.1 | >20 | 10.0 | 9.2 | 7.7 | 5.5 | 4.1 |
| 9 | 5% Cr-0.5% Mo | <.15 | .30~.60 | <.50 | 4.00~6.00 | | .45~.65 | 42.2~56.2 | >21.1 | >20 | 8.7 | 8.1 | 7.0 | 5.1 | 3.7 |
| 10 | 9% Cr | **.08 | .44 | .50 | 8.64 | | | 68.1 | | >20.5 | 7.3 | 5.4 | 3.8 | 1.3 | 0.7 |

*Denotes figures for the rolled steel sheet 2 4" thick.
**Represents a weld metal formed by a conventional procedure.

TABLE VII

| | Composition, percent | | | | | | Mechanical Strength of Filler Metal | | | | | | |
|---|---|---|---|---|---|---|---|---|---|---|---|---|---|
| | C | Si | Mn | Cr | Nb | Ti | T.S., kg./mm.² | Y.P., kg./mm.² | R.A., Percent | E., Percent | H.B. | Bend, 180° | Remark |
| Example No. 8: | | | | | | | | | | | | | |
| Filler rod | 0.06 | 0.39 | 0.60 | 13.46 | 0.83 | 1.91 | | | | | | | Coated with the usual fluxes. |
| Filler metal | 0.07 | 0.36 | 0.58 | 13.32 | 0.70 | 0.16 | 86.4 | 61.5 | 34.7 | 25.2 | 174 | Good | |
| Weld metal | 0.08 | 0.36 | 0.55 | 13.19 | 0.63 | 0.14 | | | | | 176 | do | |
| Example No. 9: | | | | | | | | | | | | | |
| Filler rod | 0.15 | 0.39 | 0.49 | 13.27 | 0.75 | 1.83 | | | | | | | |
| Filler metal | 0.16 | 0.37 | 0.47 | 13.17 | 0.74 | 1.70 | 86.4 | 62.9 | 31.8 | 23.0 | 189 | | |
| Weld metal | 0.024 | 0.36 | 0.46 | 13.08 | 0.70 | 1.41 | | | | | 203 | | |
| Parent metal | 0.32 | 0.32 | 0.47 | 12.84 | | | | | | | 194 | | |
| Example No. 10: | | | | | | | | | | | | | |
| Filler rod | 0.08 | 0.37 | 0.56 | 13.27 | | 0.67 | | | | | | | |
| Filler metal | 0.08 | 0.36 | 0.54 | 13.20 | | 0.61 | 78.6 | 58.9 | 36.5 | 28.2 | 165 | | |
| Weld metal | 0.09 | 0.36 | 0.53 | 13.36 | | 0.56 | | | | | 176 | | |
| Pipe | 0.11 | 0.35 | 0.51 | 13.44 | | | | | | | | | |

T.S.=Tensile Strength; Y.P.=Yield Point; E.=Elongation; R.A.=Reduction in Area; H.B.=Brinell Hardness.

What we claim is:
1. In a method of welding members of chromium-steels other than nickel-chromium steels of austenitic structure, the step which comprises depositing on a parent metal a chromium-steel type filler metal containing titanium portion of titanium, niobium and carbon respectively in said weld metal, the proportion of said titanium and said niobium in said filler metal to obtain said proportion in said weld metal being determined by estimating the total quantity of carbon in said weld metal, the quantities of carbon and said titanium and said niobium lost by oxidation during welding, and the variations in the quantities of said titanium and said niobium and carbon in said weld metal resulting from welding process conditions including welding current, flux used, and welding atmosphere.

3. In a method of welding members of chromium-steels other than nickel-chromium steels of austenitic structure, the step which comprises depositing on a parent metal, a chromium-steel type metal containing titanium and niobium in such proportion that the weld metal resulting therefrom has a content of titanium and niobium which corresponds to the expression, $2Ti+Nb=6C$ to $14C$ wherein Ti, Nb and C are the proportion of titanium niobium and carbon respectively in said weld metal, the proportion of said niobium and said titanium in said metal being deposited to obtain said proportion in said weld metal being determined by means of the equation: $C=[WC_1x+C_2(1-x)]$, wherein W is the weight of weld metal, $C_1$ is the average percent content of carbon in the fused portion of parent metal, $C_2$ is the average percent content of carbon in the weld metal, and $x$ is the proportion of the weld metal originating from the parent metal, and by estimating the quantities of carbon and said titanium and said niobium lost by oxidation during welding, and the variations in the quantities of said titanium and said niobium and carbon in said weld metal resulting from welding process conditions including welding current, flux used, and welding atmosphere.

4. In a method of welding members of chromium-steels other than nickel-chromium steels of austenitic structure, the step which comprises depositing on a parent metal a chromium-steel type metal containing molybdenum, titanium and niobium in such proportion that the weld metal resulting therefrom has a molybdenum content of 0.2% to 3.0% and a content of said titanium and said niobium corresponds to the expression $2Ti+Nb=6C$ to $14C$ wherein Ti, Nb and C are the proportion of titanium niobium and carbon respectively in said weld metal, the proportion of said titanium and said niobium in said metal being deposited to obtain said proportion in said weld metal being determined by means of the equation $$C=[WC_1x+C_2(1-x)]$$

wherein W is weight of weld metal, $C_1$ is the average percent content of carbon in the fused portion of parent metal, $C_2$ is average percent content of carbon in weld metal, and $x$ is the proportion of the weld metal originating from the parent metal, and by estimating the quantities of carbon and said component lost by oxidation during welding, and the variations in the quantities of said component and carbon in said weld metal resulting from welding process conditions including welding current, flux used, and welding atmosphere.

5. In a method of welding members of chromium-steels other than nickel-chromium steels of austenitic structure, the step which comprises depositing on a parent metal by means of a welding rod and a flux, a chromium-steel type metal containing titanium and niobium in such proportion that the weld metal resulting therefrom has a content of titanium and niobium which corresponds to the expression $2Ti+Nb=6C$ to $14C$ wherein Ti, Nb and C are the proportion of titanium, biolum and carbon respecitively in said weld metal, the proportion of said niobium and said titanium in said metal being deposited to obtain said proportion in said weld metal being determined by estimating the total quantity of carbon in said weld metal, the quantities of carbon and said titanium and said niobium lost by oxidation during welding, and the variations in the quantities of said titanium and said niobium and carbon in said metal resulting from welding process conditions including welding current, flux used, and welding atmosphere wherein at least part of the required quantity of said titanium is present in said flux.

6. A method according to claim 5 wherein said flux contains in addition to said titanium at least part of the required quantity of said niobium.

7. In a method of welding members of chromium-steels other than nickel-chromium steels of austenitic structure, the step which comprises depositing on a parent metal by means of a welding rod and a flux, a chromium-steel type metal containing molybdenum, titanium and niobium in such proportion that the weld metal resulting therefrom has a molybdenum content of 0.2% to 3.0% and a content of said titanium and said niobium corresponds to the expression $2Ti+Nb=6C$ to $14C$ wherein Ti, Nb and C are the proportion of titanium, niobium and carbon respectively in said weld metal, the proportion of said titanium and said niobium in said metal being deposited to obtain said proportion in said weld metal being determined by estimating the total quantity of carbon in said weld metal, the quantities of carbon and said titanium and said niobium lost by oxidation during welding, and the variations in the quantities of said titanium and said niobium and carbon in said weld metal resulting from welding process conditions including welding current, flux used, and welding atmosphere wherein at least part of the required quantity of said titanium is present in said flux.

8. A method according to claim 7 wherein said flux contains in addition to said titanium at least part of the required quantity of said niobium.

References Cited

UNITED STATES PATENTS

| | | |
|---|---|---|
| 2,110,891 | 3/1938 | Bitterfeld et al. |
| 2,248,279 | 7/1941 | Nepoti _____ 219—145 |
| 2,283,916 | 5/1942 | Comstock. |
| 2,315,156 | 3/1943 | Larrabee. |
| 3,044,872 | 7/1962 | Hayes et al. |
| 3,231,709 | 1/1966 | Foley _____ 219—145 X |

JOSEPH V. TRUHE, Primary Examiner

J. G. SMITH, Assistant Examiner

U.S. Cl. X.R.

219—145, 146